(12) United States Patent
Wang

(10) Patent No.: US 10,936,339 B2
(45) Date of Patent: Mar. 2, 2021

(54) DATA SHARING METHOD AND APPARATUS, ELECTRONIC DEVICE AND COMPUTER-READABLE STORAGE MEDIUM

(71) Applicant: BEIJING BYTEDANCE NETWORK TECHNOLOGY CO., LTD., Beijing (CN)

(72) Inventor: Yuechen Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/014,476

(22) Filed: Sep. 8, 2020

(65) Prior Publication Data

US 2020/0401420 A1 Dec. 24, 2020

Related U.S. Application Data

(63) Continuation of application No. PCT/CN2020/073150, filed on Jan. 20, 2020.

(30) Foreign Application Priority Data

Mar. 18, 2019 (CN) .......................... 201910203747.X

(51) Int. Cl.
*G06F 9/44* (2018.01)
*G06F 9/445* (2018.01)
(Continued)

(52) U.S. Cl.
CPC ........ *G06F 9/44563* (2013.01); *G06F 9/4843* (2013.01); *G06F 9/541* (2013.01); *G06F 16/9035* (2019.01)

(58) Field of Classification Search
CPC ....................................................... G06F 9/44
See application file for complete search history.

(56) References Cited

U.S. PATENT DOCUMENTS 8,914,483 B1 * 12/2014 Dixon ................ G06Q 10/1095
709/223
9,384,337 B1 7/2016 Sirbu et al.
(Continued)

FOREIGN PATENT DOCUMENTS

CN 101772941 A 7/2010
CN 103838848 A 6/2014
(Continued)

OTHER PUBLICATIONS

International Search Report and Written Opinion dated Apr. 24, 2020 for PCT Patent Application No. PCT/CN2020/073150.
(Continued)

*Primary Examiner* — Jae U Jeon
(74) *Attorney, Agent, or Firm* — Thomas Horstemeyer LLP

(57) ABSTRACT

Provided are a data sharing method and apparatus, an electronic device and a computer-readable storage medium. The method includes the following steps: issued data sharing configuration information is received, and a first application set is acquired according to the data sharing configuration information; a local second application set is acquired, and a third application set is determined according to the first application set and the second application set; the third application set is configured according to the data sharing configuration information; and the configured third application set is displayed in a data sharing interface to enable a user to share data through the third application set.

18 Claims, 3 Drawing Sheets

(51) Int. Cl.
  *G06F 16/9035* (2019.01)
  *G06F 9/48* (2006.01)
  *G06F 9/54* (2006.01)

(56) References Cited

U.S. PATENT DOCUMENTS

| 9,864,810 B2* | 1/2018 | Chumbley | ............ G06F 16/955 |
| 2016/0212209 A1* | 7/2016 | Qian | ................... H04L 67/1095 |

FOREIGN PATENT DOCUMENTS

| CN | 104063239 A | 9/2014 |
| CN | 104838630 A | 8/2015 |
| CN | 104954581 A | 9/2015 |
| CN | 106547576 A | 3/2017 |
| CN | 106919427 A | 7/2017 |
| CN | 109684116 A | 4/2019 |
| CN | 109831532 A | 5/2019 |

OTHER PUBLICATIONS

1st Search Report dated Apr. 28, 2019 for Chinese Patent Application No. 201910203747.X.
1st Office Action dated May 8, 2019 for Chinese Patent Application No. 201910203747.X.

* cited by examiner

DATA SHARING METHOD AND APPARATUS, ELECTRONIC DEVICE AND COMPUTER-READABLE STORAGE MEDIUM

CROSS REFERENCE TO RELATED APPLICATIONS

This is continuation of International Patent Application No. PCT/CN2020/073150, filed on Jan. 20, 2020, which is based on and claims priority to Chinese Patent Application No. 201910203747.X filed with the CNIPA on Mar. 18, 2019, disclosures of which are incorporated herein by reference in their entireties.

TECHNICAL FIELD

Embodiments of the present disclosure relate to the technical field of data sharing and, for example, to a data sharing method and apparatus, an electronic device and a computer-readable storage medium.

BACKGROUND

With the continuous development of science and technology, a data sharing form of generating sharing content (such as short videos, articles or pictures) in an application and pushing the sharing content to others in other applications has become an important way to exchange data and promote information dissemination and user communication.

In the related art, an implementation mode of data sharing of an application is as follows: after a user generates sharing content in the application, the user selects a corresponding application (such as WeChat or Weibo) in a sharing mode selection interface in which fixed sharing modes are written to share the content in a corresponding sharing mode (such as password sharing or link sharing), thereby implementing the dissemination of the sharing content. Usually, the sharing mode selection interface is an interface written into a version of the application when the version is released, and the sharing mode selection interface cannot be changed unless an application developer releases a new version.

In the related art, there are the following defects: with the continuous development and change of the application market, sharing modes or sharing applications for sharing data are constantly changing, for example, an emerging sharing mode is widely used by users quickly, and the used sharing modes are suddenly abandoned by the users. To address the preceding problem, in the application development, it is necessary to keep abreast of the change trends of the sharing modes or the shared applications, and continuously release new versions to deal with the changes of the sharing modes or the sharing applications. This leads to a too long configuration period of the sharing modes or the application sharing applications, which is not conducive for a user to select a sharing mode or a sharing application matched with the actual requirements.

SUMMARY

Embodiments of the present disclosure provide a data sharing method and apparatus, an electronic device and a computer-readable storage medium, so as to flexibly configure a sharing application in a data sharing interface or a sharing mode used by the sharing application.

The present disclosure provides a data sharing method. The method includes the steps described below.

Issued data sharing configuration information is received, and a first application set is acquired according to the data sharing configuration information.

A local second application set is acquired, and a third application set is determined according to the first application set and the second application set.

The third application set is configured according to the data sharing configuration information.

The configured third application set is displayed in a data sharing interface to enable a user to share data through the third application set.

The present disclosure further provides a data sharing apparatus. The apparatus includes a first application set acquisition module, a third application set determination module, a third application set configuration module and a third application set display module.

The first application set acquisition module is configured to receive issued data sharing configuration information, and acquire a first application set according to the data sharing configuration information.

The third application set determination module is configured to acquire a local second application set, and determine a third application set according to the first application set and the second application set.

The third application set configuration module is configured to configure the third application set according to the data sharing configuration information.

The third application set display module is configured to display the configured third application set in a data sharing interface to enable a user to share data through the third application set.

The present disclosure further provides an electronic device. The electronic device includes one or more processors and a memory.

The memory is configured to store one or more programs.

The one or more programs, when executed by the one or more processors, cause the one or more processors to implement the data sharing method of any embodiment of the present disclosure.

The present disclosure further provides a computer-readable storage medium. The computer-readable storage medium stores a computer program. The computer program is configured to, when executed by a processor, implement the data sharing method of any embodiment of the present disclosure.

DETAILED DESCRIPTION

Figure 1:
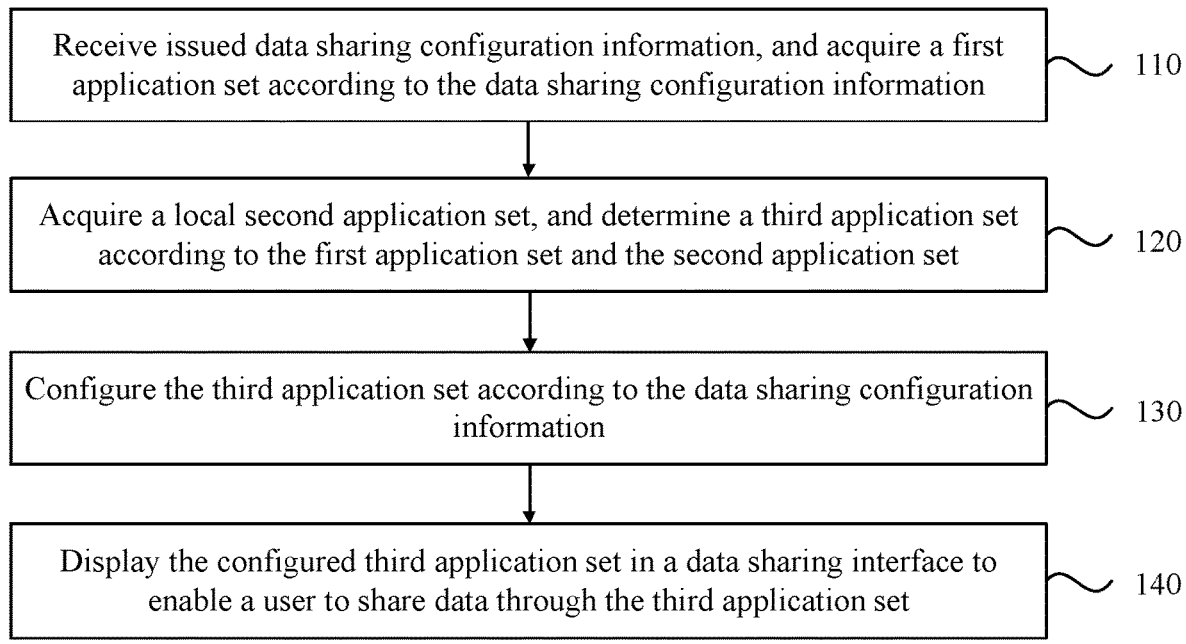
FIG. 1 is a flowchart of a data sharing method according to embodiment one of the present disclosure.

The present disclosure is described hereinafter in conjunction with the drawings and embodiments. The embodiments described herein are merely intended to explain the present disclosure but not intended to limit the present disclosure. For ease of description, only parts, not all of structures related to the present disclosure are illustrated in the drawings. Optional features and examples are provided in each of the multiple embodiments described below. Multiple features set forth in the embodiments can be combined to form multiple optional schemes. Each numbered embodiment should not be regarded as only one technical scheme.

Embodiment One

FIG. 1 is a flowchart of a data sharing method according to embodiment one of the present disclosure. This embodiment is applicable to the case where a client configures a sharing application displayed in a data sharing interface according to issued data sharing configuration information. The method may be performed by a data sharing apparatus. The apparatus may be implemented in the form of software and/or hardware. The apparatus may be configured in an electronic device, such as a smart phone or a tablet computer, installed with the client. As shown in FIG. 1, the method includes the steps described below.

In step 110, issued data sharing configuration information is received, and a first application set is acquired according to the data sharing configuration information.

In an embodiment, the method in this embodiment of the present disclosure may be performed by the client. The client is a terminal device that is used by a user and installed with an application with a sharing function. An operating system of the client includes an iOS operating system and an Android operating system. The user may log into the application with the sharing function through the client, and share data content in the application to others. Meanwhile, the client may further receive the data sharing configuration information issued by a server or other devices associated with a target application, so as to implement the dynamic configuration of a sharing application used by the target application.

The data sharing configuration information includes or is associated with the first application set.

The first application set includes a sharing application to be updated by the client. The sharing application refers to an application that may be selected as a data sharing channel in the client. For example, data content generated in application A with a sharing function may be shared in sharing application B.

The number of applications included in the first application set may be one or more.

The client may pre-store a sharing application. The first application set may be an application set that processes the pre-stored sharing application. A processing mode may be determined according to an attribute of the first application set. The attribute of the first application set may be a new addition attribute, a deletion attribute, a replacement attribute and the like. The new addition attribute refers to that an application included in the first application set needs to be added to the existing sharing application of the client. The deletion attribute refers to that the application included in the first application set needs to be deleted from the existing sharing application of the client. The replacement attribute refers to that the existing sharing application of the client needs to be replaced with the application included in the first application set.

Alternatively, the first application set may include a sharing application that needs to be used by the client. Accordingly, a sharing application of the client may be directly configured by using the first application set.

Moreover, in addition to including or being associated with the first application set, the data sharing configuration information may further include a sharing mode corresponding to an application, where the sharing mode is a sharing mode used for accordingly configuring a corresponding sharing application in the client; and the data sharing configuration information may further include a display importance level corresponding to the application, where the display importance level is used for determining a display position of the application in the data sharing interface, and the like, which is not limited in this embodiment.

In step 120, a local second application set is acquired, and a third application set is determined according to the first application set and the second application set.

In this embodiment, the local second application set may be a second application set that is locally stored and corresponds to a current data sharing interface, that is, a sharing application set currently used by the client.

Accordingly, the corresponding new addition, deletion or replacement may be performed on the second application set according to the attribute information of the first application set, so as to obtain a new sharing application set corresponding to the client, that is, the third application set.

The local second application set may also be a second application set corresponding to locally installed applications. That is, the second application set includes all applications in an installed application list of the client.

In an embodiment, the client usually needs to select a locally installed application as the sharing application for data sharing, so when the issued first application set is acquired, the intersection of the first application set and the second application set may be used as a new sharing application set corresponding to the client, that is, the third application set.

In step 130, the third application set is configured according to the data sharing configuration information.

In an embodiment, sharing modes of multiple applications in the third application set may be configured according to the sharing mode of the application included in the data sharing configuration information, and a display order of multiple applications in the third application set may be configured according to the display importance levels corresponding to the applications included in the data sharing configuration information, which are not limited in this embodiment.

In step 140, the configured third application set is displayed in the data sharing interface to enable the user to share data through the third application set.

In an embodiment, the third application set is a sharing application set for the client to share data. The third application set is displayed in the data sharing interface. The data sharing interface is displayed to the user through the client and may be an interface used for selecting the application for data sharing.

In an embodiment, the configured third application set may be displayed in the data sharing interface when a data sharing instruction is detected.

The data sharing instruction may be triggered by the user and issued by the client. For example, after the user clicks a sharing icon in the interface of the client, the client obtains the clicking operation, issues the data sharing instruction, and displays the configured third application set to the user through the data sharing interface, so that the user selects and share an application satisfying a sharing requirement.

In an optional implementation of the present disclosure, the third application set may include at least one synthesis application. Each synthesis application is associated with at least two sharing channels.

The synthesis application refers to that this application may provide sharing services to the user through at least two sharing channels. In other words, if within a sharing application, there are at least two optional sharing forms for sharing the sharing content, then the sharing application is the synthesis application. The at least two optional sharing forms within the synthesis application are the sharing channels.

For example, an "XX application" may provide a sharing channel A to share the sharing content to one or more users, and may also provide a sharing channel B to share the sharing content as a personal state to other following users. Accordingly, the application is a synthesis application with two sharing channels.

Accordingly, in the data sharing interface, the synthesis application may be replaced with the at least two sharing channels corresponding to the synthesis application, and the at least two sharing channels are displayed, so that the user may directly obtain a sharing mode of a required sharing channel to share data, thereby simplifying the sharing process of the user.

In an embodiment, if the third application set includes the "XX application", then in the data sharing interface, the "XX application" may be replaced with the "sharing channel A" and the "sharing channel B", and the "sharing channel A" and the "sharing channel B" are displayed. The user may share the sharing content through the "sharing channel A" of the "XX application" by directly clicking the "sharing channel A".

That is, the step in which the configured third application set is displayed in the data sharing interface may include the step described below.

In the data sharing interface, the synthesis application in the third application set is replaced with the at least two sharing channels matched with the synthesis application, and the at least two sharing channels matched with the application are displayed.

According to this embodiment of the present disclosure, the first application set is acquired according to the issued data sharing configuration information; the third application set is determined according to the first application set and the local second application set; the third application set is configured according to the data sharing configuration information and the third application set; and the configured third application set is displayed in the data sharing interface to enable the user to share data through the third application set. In this way, the sharing application displayed in the data sharing interface or the sharing mode corresponding to the sharing application can be dynamically updated according to the issued data sharing configuration information, thus achieving the technical effect that the sharing application or the sharing mode can be dynamically configured without releasing a new version of the application. This solves that a configuration period of the sharing mode or the sharing application is too long, which is not conducive for the user to select a sharing mode or a sharing application matched with the actual requirements, thereby achieve the effect of flexibly configuring the sharing application in the data sharing interface or the sharing mode used by the sharing application.

Embodiment Two

Figure 2:
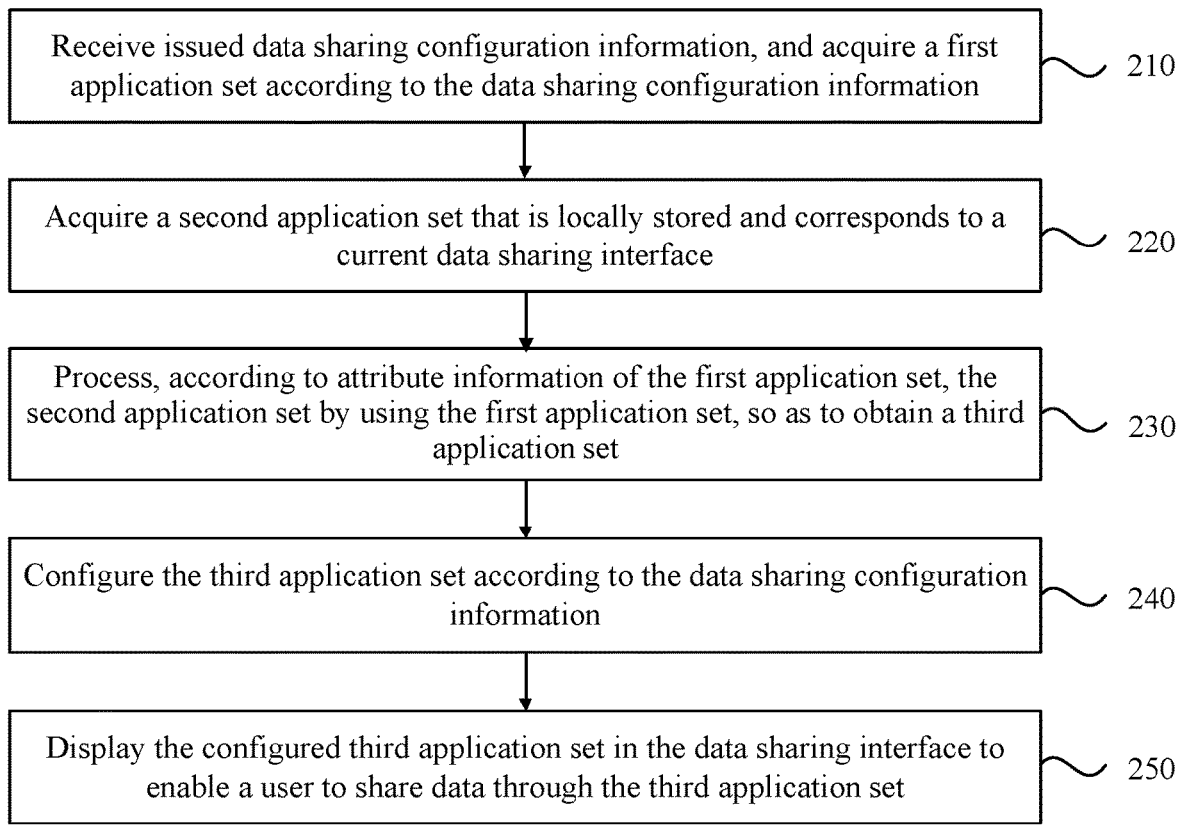
FIG. 2 is a flowchart of a data sharing method according to embodiment two of the present disclosure.

FIG. 2 is a flowchart of a data sharing method according to embodiment two of the present disclosure. This embodiment may be combined with multiple optional schemes in the one or more embodiments described above. In this embodiment, the step in which the local second application set is acquired, and the third application set is determined according to the first application set and the second application set may includes the following steps: the second application set that is locally stored and matched with a current data sharing interface is acquired, and the second application set is processed by using the first application set according to the attribute information of the first application set, so as to obtain the third application set.

Accordingly, as shown in FIG. 2, the method includes the steps described below.

In step 210, issued data sharing configuration information is received, and a first application set is acquired according to the data sharing configuration information.

In this embodiment, the step in which the issued data sharing configuration information is received may include the following step: when a client launch instruction is detected, a configuration data acquisition request is sent to a server, and the data sharing configuration information issued by the server for the configuration data acquisition request is received.

Alternatively, the step in which the issued data sharing configuration information is received may also include the following step: during an operating process of a client, the data sharing configuration information issued by the server is received.

In this optional technical scheme, the client may actively request the data sharing configuration information from the server, or may passively receive the data sharing configuration information issued by the server. Alternatively, the client may combine the two receiving modes described above together, that is, when the client detects a launch instruction of a target application, the client actively requests data sharing configuration information from the server, and during the operation process of the target application in the client, the client receives data sharing configuration information issued by the server at any time.

The benefits of this configuration are as follows: the client can configure the third application set displayed in the data sharing interface according to the received data sharing configuration information in real time, so as to ensure that sharing applications included in the data sharing interface and provided for a user in real time are in one-to-one correspondence with sharing applications currently dynamically specified by the server, thus satisfying the sharing requirements of the user.

In this embodiment, the first application set refers to an application set that processes locally pre-stored sharing applications of the client. A processing mode may be specified according to attribute information of the first application set.

In step 220, a second application set that is locally stored and corresponds to a current data sharing interface is acquired.

In this embodiment, the second application set refers to an application set displayed in the data sharing interface before the data sharing configuration information is received, or refers to a sharing application set used by the client.

In step 230, the second application set is processed by using the first application set according to the attribute information of the first application set, so as to obtain a third application set.

Optionally, the step in which the second application set is processed by using the first application set according to the attribute information of the first application set, so as to obtain the third application set may include at least one of the steps described below.

If the attribute information of the first application set is a new addition attribute, an intersection of the first application set and the second application set is acquired and used as the third application set.

If the attribute information of the first application set is a deletion attribute, a result of removing the first application set from the second application set is acquired and used as the third application set.

If the attribute information of the first application set is a replacement attribute, a result of replacing the second application set with the first application set is acquired and used as the third application set.

That is, through the first application set dynamically issued by the data sharing configuration information, the new addition operation, the deletion operation or the replacement operation may be flexibly performed on the application in the second application set that is locally stored by the client and corresponds to the data sharing interface, so as to generate the new third application set corresponding to the data sharing interface.

In step 240, the third application set is configured according to the data sharing configuration information.

In step 250, the configured third application set is displayed in the data sharing interface to enable the user to share data through the third application set.

According to the technical scheme in this embodiment of the present disclosure, the second application set that is locally stored and matched with the current data sharing interface is acquired; and the second application set is processed by using the first application set according to the attribute information of the first application set, so as to obtain the third application set, thereby achieving the purpose of flexibly configuring, according to the attribute information of the issued first application set, the second application set that is locally stored and matched with the current data sharing interface.

Embodiment Three

Figure 3:
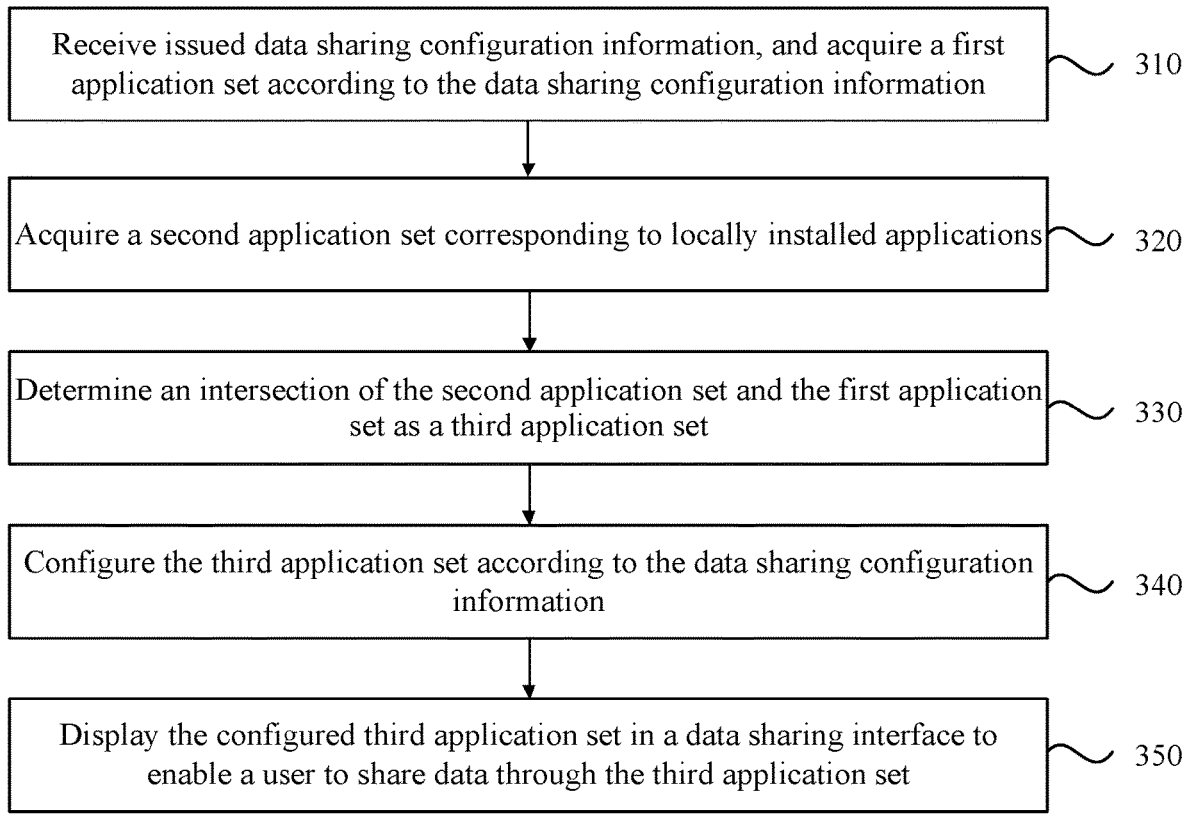
FIG. 3 is a flowchart of a data sharing method according to embodiment three of the present disclosure.

FIG. 3 is a flowchart of a data sharing method according to embodiment three of the present disclosure. This embodiment may be combined with multiple optional schemes in the one or more embodiments described above. In this embodiment, the step in which the local second application set is acquired, and the third application set is determined according to the first application set and the second application set may include the following steps: the second application set corresponding to locally installed applications is acquired, and the intersection of the second application set and the first application set is determined as the third application set.

Accordingly, as shown in FIG. 3, the method includes the steps described below.

In step 310, issued data sharing configuration information is received, and a first application set is acquired according to the data sharing configuration information.

In this embodiment, the first application set may include a sharing application that needs to be used by a client.

In step 320, a second application set corresponding to locally installed applications is acquired.

In an embodiment, after an installed application list of the client is acquired, all applications included in the installed application list are used as the second application set.

In step 330, an intersection of the second application set and the first application set is determined as the third application set.

In this embodiment, the purpose of calculating the intersection of applications is to remove, in a data sharing interface, a sharing application that cannot be used by the client, so as to ensure that each application that the user may currently view in a data sharing page is an application that may be selected by the user to share data.

In an example, the first application set acquired according to the data sharing configuration information is {application A, application B, application C, application D}, and the second application set corresponding to the locally installed applications of the client is {application B, application C, application E}.

The intersection of the first application set and the second application set is calculated, and the acquired application intersection is {application B, application C}. Since application A and application D are not installed in a terminal device, application A and application D cannot implement data sharing in the data sharing interface. In addition, application E is also excluded since application E is not an issued sharing application that can be used in the client. Thus, only application B and application C may be displayed in the data sharing interface and complete the corresponding data sharing.

In step 340, the third application set is configured according to the data sharing configuration information.

In step 350, the configured third application set is displayed in the data sharing interface to enable the user to share data through the third application set.

According to the technical scheme in this embodiment of the present disclosure, the second application set corresponding to the locally installed applications is acquired, and the intersection of the second application set and the first application set is determined as the third application set. This ensures that each sharing application provided in the data sharing interface is an application that can implement data sharing currently, thereby improving the accuracy of the sharing applications displayed in the data sharing interface.

Based on the multiple embodiments described above, the data sharing configuration information may further include a display importance level corresponding to an application.

The application including the display importance level may be the same as or different from the first application set, which is not limited in this embodiment.

The display importance level is used for determining a display position of the application in the data sharing interface.

The display importance level corresponding to each application may be directly specified manually, or determined according to traffic reference data of the application.

The traffic reference data includes download amount and a score of the application. For example, if application A currently has a higher score in an application mall, application A may be used as an application with higher usage, and accordingly, a display importance level corresponding to application A is defined as a higher level. In the case where application A is included in the data sharing interface, application A is correspondingly set at a main position in the data sharing interface, for example, the center of the interface. However, for application B with a lower score, it may be regarded that there are fewer users using application B, so a display importance level corresponding to application B may be defined as a lower level. In the case where application B is included in the data sharing interface, application B is correspondingly set at a secondary position in the data sharing interface, for example, the bottom of the interface.

In an embodiment, the traffic reference data may further include other types of data, such as a promotion index of an application, the update speed of a version of the application, the number of times of the application selected as a sharing application, and the number of daily active users of the application, which are not limited in this embodiment.

In an embodiment, a data sharing interface in the related art is a narrow-side display bar. One or more applications in the third application set are displayed in a single column within the narrow-side display bar. Accordingly, applications included in the third application set may be arranged in the column from the head to the tail according to an order for display importance levels from high to low.

According to this optional technical scheme, the data sharing configuration information includes not only the first application set, but also the display importance level corresponding to the application. In other words, when the client configures the data sharing interface, the client configures not only the applications in the data sharing interface, but also display positions of different applications, so that the application with a higher display importance level is at a position that the user is most likely to pay attention to. The above configuration of the display importance level is conducive to promoting some new sharing applications, and is also conducive to the user to find the most commonly used sharing application quickly.

Embodiment Four

Figure 4:
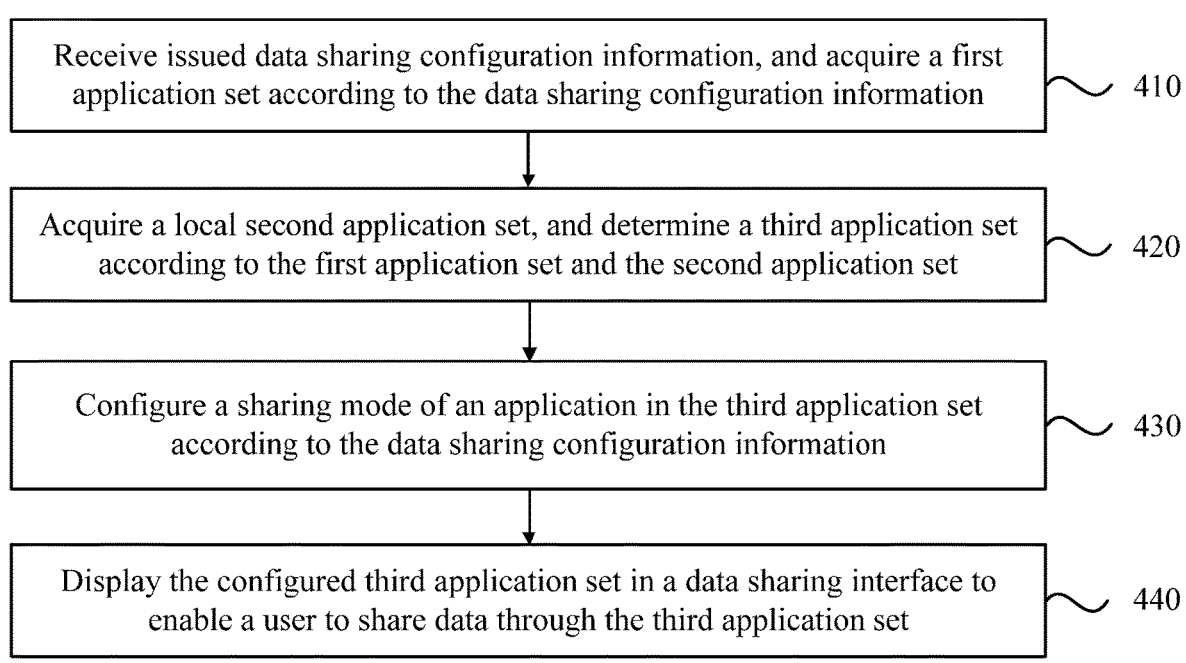
FIG. 4 is a flowchart of a data sharing method according to embodiment four of the present disclosure.

FIG. 4 is a flowchart of a data sharing method according to embodiment four of the present disclosure. This embodiment may be combined with multiple optional schemes in the one or more embodiments described above. In this embodiment, the data sharing configuration information may include a sharing mode matched with an application, and the step in which the third application set is configured according to the data sharing configuration information may include the following step: a sharing mode of an application in the third application set is configured according to the data sharing configuration information.

Accordingly, as shown in FIG. 4, the method includes the steps described below.

In step 410, issued data sharing configuration information is received, and a first application set is acquired according to the data sharing configuration information.

In this embodiment, the data sharing configuration information may include a sharing mode matched with an application. The application including the corresponding sharing mode may be the same as or different from the first application set.

The sharing mode refers to a way in which the application shares data content to be shared. In an embodiment, the sharing mode may include application sharing interface sharing, download sharing, applet sharing, combination sharing, link sharing, password sharing or the like, which is not limited in this embodiment.

In step 420, a local second application set is acquired, and a third application set is determined according to the first application set and the second application set.

In step 430, a sharing mode of an application in the third application set is configured according to the data sharing configuration information.

The sharing mode of the application in the third application set is configured, so as to implement that when a user selects an application in a data sharing interface, the data content is shared in the application by using the pre-configured sharing mode.

In step 440, the configured third application set is displayed in the data sharing interface to enable the user to share data through the third application set.

In an optional implementation of this embodiment, the sharing mode may include the download sharing.

Accordingly, after the step in which the configured third application set is displayed in the data sharing interface, the method further includes the steps described below.

Data content to be shared currently is locally stored according to a selection of the user on a first application with the sharing mode being the download sharing in the data sharing interface; and it is jumped to an application sharing interface matched with the first application to enable the user to share the locally stored data content in the application sharing interface.

In an embodiment, when the client determines that the user selects the first application configured with the download sharing, the client locally downloads the data content (such as pictures or short videos) to be shared currently in a set storage directory. After the download is completed, it is jumped to the application sharing interface matched with the first application until the user shares the downloaded data content.

In an optional implementation of this embodiment, the sharing mode may include the applet sharing.

Accordingly, after the step in which the configured third application set is displayed in the data sharing interface, the method may further include the steps described below.

At least one candidate applet matched with a second application is displayed according to a selection of the user on the second application with the sharing mode being the applet sharing in the data sharing interface; and the data content to be shared currently is shared by using the candidate applet selected by the user.

The applet sharing is a sharing mode of sharing within an application, where the sharing mode is implemented by using an applet in the application. In an embodiment, the second application may be pre-configured or developed with multiple applets, and accordingly, the data content to be shared currently may be shared in the second application in the manner of applet sharing.

In an optional implementation of this embodiment, the sharing mode may include the combination sharing. The combination sharing includes at least two single sharing modes (such as the download sharing or the applet sharing).

Accordingly, after the step in which the configured third application set is displayed in the data sharing interface, the method may further include the steps described below.

The at least two single sharing modes included in the combination sharing are displayed according to a selection of the user on a third application with the sharing mode being the combination sharing in the data sharing interface, and the data content to be shared currently is shared by using the single sharing selected by the user from the combination sharing.

According to the technical scheme of this embodiment of the present disclosure, the sharing mode of the application in the third application set is configured according to the data sharing configuration information, thereby achieving the effect of flexibly configuring the sharing mode of the application according to the data sharing configuration information and improving the configuration flexibility of the data sharing.

Based on the multiple embodiments described above, the data sharing configuration information may further include system sharing information.

The system sharing information refers to a system sharing mode for data sharing through an operating system, where the system sharing mode is displayed by the client in the data sharing interface.

Accordingly, the step in which the configured third application set is displayed in the data sharing interface may include the step described below.

The configured third application set and a system sharing mode matched with the system sharing information are displayed in the data sharing interface.

That is, in this embodiment, the system sharing mode may be displayed in the data sharing interface in addition to the configured third application set.

Accordingly, after the step in which the configured third application set and the system sharing mode matched with the system sharing information are displayed in the data sharing interface, the method further includes the steps described below.

It is jumped to a native panel of the operating system according to a selection of the user on the system sharing mode in the data sharing interface. The native panel is configured to display a fourth application set matched with the operating system.

The data content to be shared currently is shared through a sharing interface matched with a selected application and called by the native panel according to the selection of the user on the fourth application set in the native panel.

When the most sharing applications adapt to the operating system (such as an iOS operating system or an Android operating system), they generally open an sharing interface to the operating system, and then the native panel of the operating system may directly call the sharing interface corresponding to the application selected by the user, so that the data content to be shared currently is shared. In an embodiment, the fourth application set refers to, among sharing applications installed in a terminal, a set of all applications of which the sharing interfaces are opened to the operating system.

According to the multiple optional technical schemes described above, multiple types of sharing modes are provided, thereby ensuring the formal flexibility in the case of configuring the sharing mode.

Embodiment Five

Figure 5:
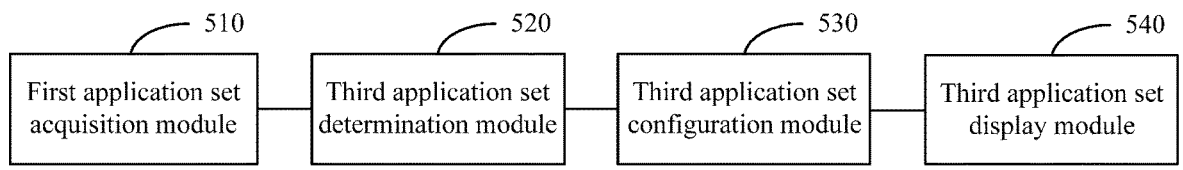
FIG. 5 is a structural diagram of a data sharing apparatus according to embodiment five of the present disclosure.

FIG. 5 is a structural diagram of a data sharing apparatus according to embodiment five of the present disclosure. This embodiment is applied to a client and is applicable to the case of configuring a sharing application displayed in a data sharing interface according to issued data sharing configuration information. The apparatus may be implemented in the manner of software and/or hardware. The apparatus may be configured in an electronic device, such as a smart phone or a tablet computer, installed with the client. As shown in FIG. 5, the apparatus may include a first application set acquisition module 510, a third application set determination module 520, a third application set configuration module 530 and a third application set display module 540.

The first application set acquisition module 510 is configured to receive issued data sharing configuration information, and acquire a first application set according to the data sharing configuration information.

The third application set determination module 520 is configured to acquire a local second application set, and determine a third application set according to the first application set and the second application set.

The third application set configuration module 530 is configured to configure the third application set according to the data sharing configuration information.

The third application set display module 540 is configured to display the configured third application set in the data sharing interface to enable a user to share data through the third application set.

Based on the multiple embodiments described above, the third application set determination module 520 includes a first set acquisition unit and a first set determination unit.

The first set acquisition unit is configured to acquire the second application set that is locally stored and corresponds to a current data sharing interface.

The first set determination unit is configured to process, according to attribute information of the first application set, the second application set by using the first application set, so as to obtain the third application set.

Based on the multiple embodiments described above, the first set determination unit is configured to perform the operations described below.

If the attribute information of the first application set is a new addition attribute, an intersection of the first application set and the second application set is acquired and used as the third application set.

If the attribute information of the first application set is a deletion attribute, a result of removing the first application set from the second application set is acquired and used as the third application set.

If the attribute information of the first application set is a replacement attribute, a result of replacing the second application set with the first application set is acquired and used as the third application set.

Based on the multiple embodiments described above, the third application set determination module 520 includes a second set acquisition unit and a second set determination unit.

The second set acquisition unit is configured to acquire the second application set corresponding to locally installed applications.

The second set determination unit is configured to determine the intersection of the second application set and the first application set as the third application set.

Based on the multiple embodiments described above, the data sharing configuration information includes a sharing mode matched with an application.

The third application set configuration module 530 is configured to perform the operation described below.

A sharing mode of an application in the third application set is configured according to the data sharing configuration information.

Based on the multiple embodiments described above, the sharing mode includes download sharing.

Based on the multiple embodiments described above, after the third application set display module 540, the apparatus further includes a data content storage module and a first data content sharing module.

The data content storage module is configured to locally store data content to be shared currently according to a selection of the user on a first application with the sharing mode being the download sharing in the data sharing interface.

The first data content sharing module is configured to jump to an application sharing interface matched with the first application to enable the user to share the locally stored data content in the application sharing interface.

Based on the multiple embodiments described above, the sharing mode includes applet sharing.

Based on the multiple embodiments described above, after the third application set display module 540, the apparatus further includes an applet display module and a second data content sharing module.

The applet display module is configured to display, according to a selection of the user on a second application with the sharing mode being the applet sharing in the data sharing interface, at least one candidate applet matched with the second application.

The second data content sharing module is configured to share the data content to be shared currently by using a candidate applet selected by the user.

Based on the multiple embodiments described above, the sharing mode includes combination sharing. The combination sharing includes at least two single sharing modes.

Based on the multiple embodiments described above, after the third application set display module 540, the apparatus further includes a single sharing mode display module and a third data content sharing module.

The single sharing mode display module is configured to display, according to a selection of the user on a third application with the sharing mode being the combination sharing in the data sharing interface, the at least two single sharing modes included in the combination sharing.

The third data content sharing module is configured to share the data content to be shared currently by using a single sharing mode selected by the user from the combination sharing.

Based on the multiple embodiments described above, the data sharing configuration information further includes system sharing information.

The third application set display module 540 includes an application set and sharing mode display unit.

The application set and sharing mode display unit is configured to display, in the data sharing interface, the configured third application set and a system sharing mode matched with the system sharing information.

Based on the multiple embodiments described above, after the application set and sharing mode display unit, the third application set display module 540 further includes a native panel jumping unit and a data content sharing unit.

The native panel jumping unit is configured to jump to a native panel of an operating system according to a selection of the user on the system sharing mode in the data sharing interface. The native panel is configured to display a fourth application set matched with the operating system.

The data content sharing unit is configured to share the data content to be shared currently through a sharing interface matched with a selected application and called by the native panel according to a selection of the user on the fourth application set in the native panel.

Based on the multiple embodiments described above, the third application set includes at least one synthesis application. The synthesis application is associated with at least two sharing channels.

The third application set display module 540 includes a synthesis application display unit.

The synthesis application display unit is configured to in the data sharing interface, replace the synthesis application in the third application set with the at least two sharing channels matched with the synthesis application to display the at least two sharing channels matched with the synthesis application.

Based on the multiple embodiments described above, the first application set acquisition module 510 includes a first data sharing configuration information reception module and/or a second data sharing configuration information reception module.

The first data sharing configuration information reception module is configured to, in response to detecting a client launch instruction, send a configuration data acquisition request to a server, and receive the data sharing configuration information issued by the server for the configuration data acquisition request.

The second data sharing configuration information reception module is configured to, during an operating process of a client, receive the data sharing configuration information issued by the server.

Based on the multiple embodiments described above, the data sharing configuration information further includes a display importance level corresponding to an application.

The display importance level is used for determining a display position of the application in the data sharing interface.

According to this embodiment of the present disclosure, the first application set is acquired according to the issued data sharing configuration information; the third application set is determined according to the first application set and the local second application set; the third application set is configured according to the data sharing configuration information and the third application set; and the configured third application set is displayed in the data sharing interface to enable the user to share data through the third application set. In this way, the sharing application displayed in the data sharing interface or the sharing mode corresponding to the sharing application can be dynamically updated according to the issued data sharing configuration information, thus achieving the technical effect that the sharing application or the sharing mode can be dynamically configured without releasing a new version of the application.

This solves that a configuration period of the sharing mode or the sharing application is too long, which is not conducive for the user to select a sharing mode or a sharing application matched with the actual requirements, thereby achieving the effect of flexibly configuring the sharing application in the data sharing interface or the sharing mode used by the sharing application.

For the data sharing apparatus provided by this embodiment of the present disclosure, the details not described in this embodiment of the present disclosure may be referred to the preceding embodiments. In addition, this embodiment of the present disclosure has the same beneficial effects as the preceding embodiments.

Embodiment Six

Figure 6:
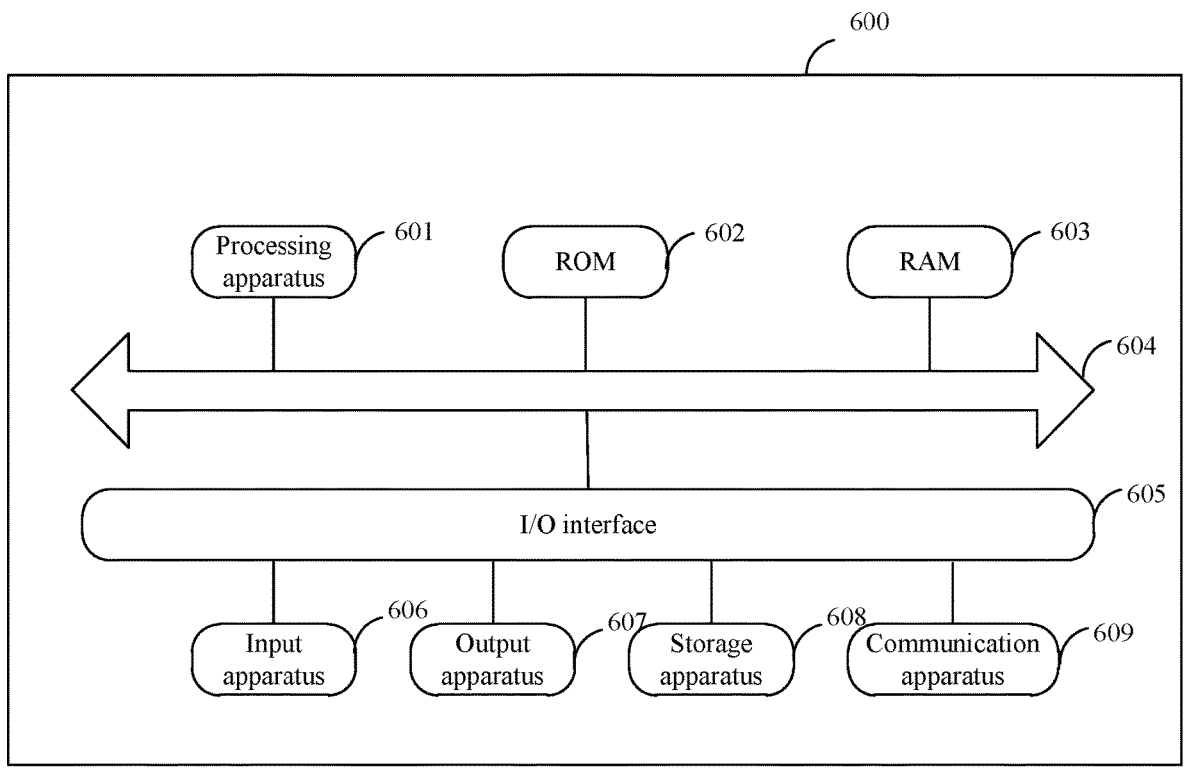
FIG. 6 is a structural diagram of an electronic device according to embodiment six of the present disclosure.

Embodiment six of the present disclosure provides an electronic device. With reference to FIG. 6, FIG. 6 is a structural diagram of an electronic device 600 (such as a client or a server) for implementing the embodiments of the present disclosure. The electronic device in this embodiment of the present disclosure may include a mobile terminal such as a mobile phone, a laptop, a digital broadcast receiver, a personal digital assistant (PDA), a tablet computer (portable Android device (PAD)), a personal multimedia player (PMP), and an in-vehicle terminal (for example, an in-vehicle navigation terminal); and a stationary terminal such as a digital television (TV) and a desktop computer. The electronic device shown in FIG. 6 is merely an example and should not suggest any limitation as to the function and the usage scope of this embodiment of the present disclosure.

As shown in FIG. 6, the electronic device 600 may include a processing apparatus 601 (such as a central processor or a graphics processor). The processing apparatus 601 may perform various appropriate actions and processing according to a program stored in a read-only memory (ROM) 602 or a program loaded from a storage apparatus 608 into a random access memory (RAM) 603. The RAM 603 also stores various applications and data required for the operations of the electronic device 600. The processing apparatus 601, the ROM 602 and the RAM 603 are connected to each other through a bus 604. An input/output (I/O) interface 605 is also connected to the bus 604.

Generally, the following apparatus may be connected to the I/O interface 605: an input apparatus 606 including, for example, a touch screen, a touch pad, a keyboard, a mouse, a camera, a microphone, an accelerometer and a gyroscope; an output apparatus 607 including, for example, a liquid crystal display (LCD), a speaker and a vibrator; a storage apparatus 608 including, for example, a magnetic tape and a hard disk; and a communication apparatus 609. The communication apparatus 609 may allow that the electronic device 600 performs wireless or wired communication with other devices to exchange data. Although FIG. 6 shows the electronic device 600 with various apparatuses, it is not necessary that all the shown apparatuses are implemented or equipped. Alternatively, more or fewer apparatuses may be implemented or equipped.

According to this embodiment of the present disclosure, the processes described above with reference to the flowcharts may be implemented as computer software programs. For example, this embodiment of the present disclosure includes a computer program product. The computer program product includes a computer program carried in a computer-readable medium. The computer program includes program codes for performing the method shown in the flowchart. In such an embodiment, the computer program may be downloaded and installed from the network through the communication apparatus 609, or may be installed from the storage apparatus 608, or may be installed from the ROM 602. When the computer program is executed by the processing apparatus 601, the preceding functions defined in the data sharing methods of the embodiments of the present disclosure are implemented.

Embodiment Seven

Embodiment seven of the present disclosure further provides a computer-readable storage medium. The computer-readable medium may be a computer-readable signal medium, a computer-readable storage medium, or any combination thereof. The computer-readable storage medium may be, for example, an electronic, magnetic, optical, electromagnetic, infrared or semiconductor system, apparatus or device, or any combination thereof. The computer-readable storage medium may include an electrical connection with one or more wires, a portable computer magnetic disk, a hard disk, an RAM, an ROM, an erasable programmable read-only memory (EPROM) or a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a base band or as a part of a carrier wave. Computer-readable program codes are carried in the data signal. This propagated data signal may take multiple forms including an electromagnetic signal, an optical signal, or any appropriate combination thereof. The computer-readable signal medium may also be any computer-readable medium other than the computer-readable storage medium. The computer-readable signal medium may send, propagate or transmit the program used by or used in conjunction with the instruction execution system, apparatus or device. The program codes included in the computer-readable medium may be transmitted in any appropriate medium including a wire, an optical cable, a radio frequency (RF), or any appropriate combination thereof.

The computer-readable medium may be included in the proceeding electronic device, or may exist alone without being assembled into the electronic device.

The computer-readable medium carries one or more programs. When the one or more programs are executed by the electronic device, causing the electronic device to perform the following operations: receiving issued data sharing configuration information, and acquiring a first application set according to the data sharing configuration information; acquiring a local second application set, and determining a third application set according to the first application set and the second application set; configuring the third application set according to the data sharing configuration information; and displaying the configured third application set in a data sharing interface to enable a user to share data through the third application set.

Computer program codes for performing the operations in the present disclosure may be written in one or more programing languages or a combination thereof. The preceding one or more programing languages include an object-oriented programing language such as Java, Smalltalk and C++, as well as a conventional procedural programing language such as "C" language or similar programing languages. The program codes may be executed entirely on a user computer, partially on a user computer, as a stand-alone software package, partially on a user computer and partially on a remote computer, or entirely on a remote computer or a server. In the case relating to a remote computer, the remote computer may be connected to the user computer via any kind of network including a local area network (LAN) or a wide area network (WAN), or may be connected to an external computer (for example, via the Internet using an Internet service provider).

The flowcharts and block diagrams in the drawings show possible architectures, functions and operations of the systems, methods and computer program products according to the multiple embodiments of the present disclosure. In this regard, each block in the flowcharts or block diagrams may represent a module, a program section or part of codes. The module, the program section or the part of codes includes one or more executable instructions for implementing specified logical functions. It is also to be noted that, in some alternative implementations, the functions noted in the blocks may occur in an order different from the order noted in the drawings. For example, two blocks shown in succession may, in fact, be executed substantially concurrently, or sometimes executed in the reverse order, depending upon the functions involved. It is also to be noted that each block in the block diagrams and/or flowcharts, and a combination of blocks in the block diagrams and/or flowcharts may be implemented by a specific-purpose hardware-based system that performs specified functions or actions, or may be implemented by a combination of specific-purpose hardware and computer instructions.

The described modules involved in the embodiments of the present disclosure may be implemented by software or hardware. The name of a module is not intended to limit the module in a certain case.

What is claimed is:

1. A data sharing method, comprising:
receiving issued data sharing configuration information, and acquiring a first application set according to the data sharing configuration information;
acquiring a local second application set, and determining a third application set according to the first application set and the second application set;
configuring the third application set according to the data sharing configuration information; and
displaying the configured third application set in a data sharing interface to enable a user to share data through the third application set;
wherein determining the third application set according to the first application set and the second application set comprises:
processing, according to attribute information of the first application set, the second application set by using the first application set, so as to obtain the third application set; and
wherein processing, according to the attribute information of the first application set, the second application set by using the first application set, so as to obtain the third application set comprises at least one of the following:
in a case where the attribute information of the first application set is a new addition attribute, acquiring an intersection of the first application set and the second application set, and using the intersection as the third application set;
in a case where the attribute information of the first application set is a deletion attribute, acquiring a result of removing the first application set from the second application set, and using the result as the third application set; or
in a case where the attribute information of the first application set is a replacement attribute, acquiring a result of replacing the second application set with the first application set, and using the result as the third application set.

2. The method of claim 1, wherein acquiring the local second application set comprises:
acquiring the second application set that is locally stored and corresponds to a current data sharing interface.

3. The method of claim 1, wherein acquiring the local second application set, and determining the third application set according to the first application set and the second application set comprises:
acquiring the second application set corresponding to locally installed applications; and
determining an intersection of the second application set and the first application set as the third application set.

4. The method of claim 1, wherein the data sharing configuration information comprises a sharing mode matched with an application; and
wherein configuring the third application set according to the data sharing configuration information comprises:
configuring a sharing mode of an application in the third application set according to the data sharing configuration information.

5. The method of claim 4, wherein the sharing mode comprises download sharing.

6. The method of claim 5, wherein after displaying the configured third application set in the data sharing interface, the method further comprises:
storing locally data content to be shared currently according to a selection of the user on a first application with the sharing mode being the download sharing in the data sharing interface; and
jumping to an application sharing interface matched with the first application to enable the user to share the locally stored data content in the application sharing interface.

7. The method of claim 4, wherein the sharing mode comprises applet sharing.

8. The method of claim 7, wherein after displaying the configured third application set in the data sharing interface, the method further comprises:
displaying, according to a selection of the user on a second application with the sharing mode being the applet sharing in the data sharing interface, at least one candidate applet matched with the second application; and
sharing data content to be shared currently by using a candidate applet selected by the user.

9. The method of claim 4, wherein the sharing mode comprises combination sharing, and the combination sharing comprises at least two single sharing modes.

10. The method of claim 9, wherein after displaying the configured third application set in the data sharing interface, the method further comprises:
displaying, according to a selection of the user on a third application with the sharing mode being the combination sharing in the data sharing interface, the at least two single sharing modes comprised in the combination sharing; and
sharing, by using a single sharing mode selected by the user from the combination sharing, data content to be shared currently.

11. The method of claim 1, wherein the data sharing configuration information further comprises system sharing information; and
wherein displaying the configured third application set in the data sharing interface comprises:
displaying, in the data sharing interface, the configured third application set and a system sharing mode matched with the system sharing information.

12. The method of claim 11, wherein after displaying, in the data sharing interface, the configured third application set and the system sharing mode matched with the system sharing information, the method further comprises:
jumping to a native panel of an operating system according to a selection of the user on the system sharing mode in the data sharing interface, wherein the native panel is configured to display a fourth application set matched with the operating system; and
sharing data content to be shared currently through a sharing interface matched with a selected application and called by the native panel according to a selection of the user on the fourth application set in the native panel.

13. The method of claim 1, wherein the third application set comprises at least one synthesis application, and each synthesis application is associated with at least two sharing channels; and
wherein displaying the configured third application set in the data sharing interface comprises:

in the data sharing interface, replacing the synthesis application in the third application set with the at least two sharing channels matched with the synthesis application to display the at least two sharing channels matched with the synthesis application.

14. The method of claim 1, wherein receiving the issued data sharing configuration information comprises at least one of the following:
in response to detecting a client launch instruction, sending a configuration data acquisition request to a server, and receiving the data sharing configuration information issued by the server for the configuration data acquisition request; or during an operating process of a client, receiving the data sharing configuration information issued by a server.

15. The method of claim 1, wherein the data sharing configuration information further comprises a display importance level corresponding to an application, wherein the display importance level is used for determining a display position of the application in the data sharing interface.

16. A data sharing apparatus, comprising:
a first application set acquisition module, configured to receive issued data sharing configuration information, and acquire a first application set according to the data sharing configuration information;
a third application set determination module, configured to acquire a local second application set, and determine a third application set according to the first application set and the second application set;
a third application set configuration module, configured to configure the third application set according to the data sharing configuration information; and
a third application set display module, configured to display the configured third application set in a data sharing interface to enable a user to share data through the third application set;

wherein the third application set determination module comprises a first set determination unit, and the first set determination unit is configured to process, according to attribute information of the first application set, the second application set by using the first application set, so as to obtain the third application set; and
wherein the first set determination unit is configured to perform following operations;
in a case where the attribute information of the first application set is a new addition attribute, acquiring an intersection of the first application set and the second application set, and using the intersection as the third application set;
in a case where the attribute information of the first application set is a deletion attribute, acquiring a result of removing the first application set from the second application set, and using the result as the third application set; and
in a case where the attribute information of the first application set is a replacement attribute, acquiring a result of replacing the second application set with the first application set, and using the result as the third application set.

17. An electronic device, comprising:
at least one processor; and
a memory, configured to store at least one program;
wherein the at least one program, when executed by the at least one processor, causes the at least one processor to implement the data sharing method of claim 1.

18. A non-transitory computer-readable storage medium, storing a computer program, wherein the computer program is configured to, when executed by a processor, implement the data sharing method of claim 1.

\* \* \* \* \*